United States Patent [19]
Schwalley et al.

[11] 3,839,214
[45] Oct. 1, 1974

[54] TETRABORATE COMPOSITION

[75] Inventors: Lawrence L. Schwalley, Whittier; William C. Teach, Anaheim; Julia W. Kiene, Seal Beach, all of Calif.

[73] Assignee: U.S. Borax & Chemical Corporation, Los Angeles, Calif.

[22] Filed: Mar. 8, 1972

[21] Appl. No.: 232,936

Related U.S. Application Data

[63] Continuation-in-part of Ser. No. 837,334, June 27, 1969, abandoned.

[52] U.S. Cl. ............... 252/106, 252/107, 252/132, 252/135, 252/524, 252/531, 252/532, 252/535, 252/538, 252/539
[51] Int. Cl. .......................... C11d 3/04, C11d 9/50
[58] Field of Search .................... 8/137, 139, 142; 252/DIG. 2, DIG. 15, 106, 135, 132

[56] References Cited
UNITED STATES PATENTS

| | | | |
|---|---|---|---|
| 3,000,830 | 9/1961 | Fong et al. | 252/117 |
| 3,318,816 | 5/1967 | Trowbridge | 252/524 |
| 3,509,059 | 4/1970 | Renold | 252/135 |
| 3,523,087 | 8/1970 | Trent | 252/106 |
| 3,557,002 | 1/1971 | McCarty | 252/89 |

FOREIGN PATENTS OR APPLICATIONS

| | | |
|---|---|---|
| 231,441 | 11/1960 | Australia |
| 664,428 | 6/1963 | Canada |

OTHER PUBLICATIONS

Condensed Chemical Dict. 7th Ed., Reinhold Publishing Co., N.Y., 1966, P. 878.
Gregory – "Uses and Applications of Chem. and Related Materials," 1939, pp. 111 and 112.

*Primary Examiner*—Leon D. Rosdol
*Assistant Examiner*—P. E. Willis
*Attorney, Agent, or Firm*—Knobbe, Martens, Olson, Hubbard & Bear

[57] ABSTRACT

A laundry pretreating composition having up to 99 percent alkali metal tetraborate, from 0.1 to 2 percent polyvinylpyrrolidone and up to 2 percent polyhalosalicylanilide. Sodium tetraborate and tribromosalicylanilide are preferred. A process for pretreating stained fabrics by soaking in the composition is also disclosed.

6 Claims, No Drawings

TETRABORATE COMPOSITION

CROSS REFERENCE

This is a continuation-in-part of copending application Ser. No. 837,334, filed June 27, 1969 and now abandoned.

This invention is directed to a tetraborate laundry pretreatment composition. More particularly the invention relates to a composition comprising a heterogeneous mixture of an alkali metal tetraborate, polyhalosalicylanilide and polyvinylpyrrolidone which is a highly effective bactericide and stain remover.

Compositions for treating soiled laundry prior to detergent wash are presently available which combine the effectiveness of a stain removing builder such as borax (sodium tetraborate decahydrate, $Na_2B_4O_7 \cdot 10\ H_2O$) and a soil suspending agent such as carboxymethyl cellulose (also referred to as CMC or sodium carboxymethyl cellulose). The carboxymethyl cellulose in these compositions appears to act independently of the tetraborate, however, so that the total stain removing efficiency is attributable to the sum of the independent action of the tetraborate and the carboxymethyl cellulose. This appears to be true of most commercial soil suspending agents presently used in combination with the tetraborates. Additionally, no completely effective sanitizing or bactericidal agent has been found which is compatible with both the tetraborate and the soil suspending agent.

It has now been discovered that alkali metal tetraborates such as sodium tetraborate decahydrate, sodium tetraborate pentahydrate and potassium tetraborate when combined with a particular soil suspending agent exhibit a stain removing quality when used in the wash cycle and as a pretreatment which is greater than would be expected as the sum of independent treatment with the tetraborate and the soil suspending agent. Even more surprising is that the composition is extremely efficient in reduction of the *E. coli* bacteria count when it contains a particular bactericidal compound. The term composition is used in its broadest sense herein to refer to a product produced by combining or mixing. The preferred product is actually a heterogeneous mixture of components.

One feature of the composition of this invention is that the effectiveness of the washing pretreatment composition is dramatically enhanced even though only small quantities of the preferred soil suspending agents are employed in combination with the sodium tetraborate.

Another feature of the composition of this invention is that the appearance of fabrics treated with the composition is much more acceptable than fabrics treated with detergents only when not pretreated or rinsed in the composition of the invention.

Another feature of the composition of this invention is that the aqueous solution can be relatively dilute and still the beneficial effects will be obtained.

Yet another feature of the composition of this invention is that it is extremely effective in short periods of time in reducing the harmful *E. coli* bacteria count.

Basically the stain removing and bactericidal composition of this invention comprises a major portion of an alkali metal tetraborate, preferably greater than 85 percent by weight, along with a synergistic amount of the soil suspending agent polyvinylpyrrolidone. The preferred alkali metal tetraborate is sodium tetraborate because of its availability and excellent compatibility with polyvinylpyrrolidone. Preferably, a hydrated sodium tetraborate, such as the decahydrate, is employed.

The polyvinylpyrrolidone is preferably about 0.5 percent by weight but may be increased up to about 2 percent. At least 0.1 percent of the soil suspending agent is necessary to obtain the effective enhancement in stain removal sought by the composition. Expressed in terms of the weight ratio of sodim tetraborate (ignoring the water of hydration) to polyvinylpyrrolidone, satisfactory results have been obtained with a ratio of from about 25:1 to 500:1 with optimum spot and stain removal being obtained when this ratio is about 50 to 100:1.

The preferred polyvinylpyrrolidones have an average molecular weight of from about 15,000 to 40,000. Although it should be understood that any polyvinylpyrrolidone which is soluble in water at least to the extent of 0.001 to about 0.1 percent can be used.

It has been found that the polyvinylpyrrolidone when combined specifically with sodium tetraborate exhibits an unexpectedly high increase in stain removal properties. Comparisons have been made between compositions consisting of inert fillers or builders and polyvinylpyrrolidone and the composition of this invention comprising sodium tetraborate and polyvinylpyrrolidone. The observed spot and stain removal after pretreating soiled common articles of clothing with the inert builder and polyvinylpyrrolidone and then washing with detergent and the inert builder-polyyinylpyrrolidone combination was actually less than the stain removal after the same pretreatment with detergent alone and washing with detergent alone. Similar results have been observed for treatment with sodium tetraborate alone. When the same amount of polyvinylpyrrolidone was added to the sodium tetraborate as had been added to the inert builder and the same treatment steps followed a significant and unpredictable increase in stain removal was immediately observed when the same pretreatment-washing process was used.

The compositions of this invention preferably also include a bactericidal agent which is compatible with both the sodium tetraborate and the polyvinylpyrrolidone. The bactericides which have been found to be especially effective for the composition of this invention are the polyhalosalicylanilides, such as 3,4',5-tribromosalicylanilide, 3,4',5-triiodosalicylanilide, 3,4-',5-trichlorosalicylanilide, 3,5-dibromo-4'-chlorosalicylanilide, 4',5-dibromosalicylanilide and 3,-5-dibromo-3'-trifluoromethylsalicylanilide as well as other polyhalo trifluoromethylsalicylanilides. For example, it has been found when 3,4',5-tribromosalicylanilide is combined with the sodium tetraborate and polyvinylpyrrolidone the bactericidal activity increases by a greater extent than would normally be expected. The tribromosalicylanilide with this combination has been found especially effective in reducing the *E. coli* bacteria. The preferred amount of bactericidal agent which is used in the composition of this invention is 0.1 to 0.5 percent by weight of the total composition though up to about 2 percent by weight can be used.

Unless otherwise indicated, all of the percentages of components set forth for the pretreatment composition as expressed herein are intended to be percent by weight rather than by volume. The weight percentage expressed for the tetraborates, unless otherwise specified, includes the water of hydration. The water of hydration thus comprises a high portion of the total weights set forth herein of tetraborates such as sodium tetraborate pentahydrate, sodium tetraborate decahydrate and potassium tetraborate (a tetrahydrate).

A surfactant may also be included in the composition. Any of the anionic or nonionic synthetic detergents or soaps can be used. These include water-soluble salts of higher aliphatic and aromatic sulfuric acids such as the sodium salts of alkylbenzenesulfonic acids and long chain alkysulfates. Specific examples of such suitable surfactants include sodium octyl-, nonyl-, dodecyl-, decyl-, and tetradecylbenzenesulfonates, sodium diisopropylnaphthalene sulfonate, sodium isopropylnaphthalene sulfate, long chain alkylsulfates such as sodium lauryl- and stearyl- sulfates, the mahogany and petroleum sulfonates, long chain alkyloxyethylene sulfates such as sodium or potassium laurylpolyoxyethylene sulfate, sodium laurylmonooxyethylene sulfate, sodium octadecylpolyoxyethylene sulfate and sodium cetylpolyoxyethylene sulfate, long chain alkylaryloxyethylene sulfates such as ammonium, sodium or potassium nonyl-, octyl-, and tridecylphenol mono- and polyoxyethylene sulfates, alkyl phenoxy oxypolyalkylene alkanols, long chain alkyl isethionates such as sodium oleic isethionate and sodium lauric isethionate, lower alkyl sulfates and sulfonates such as sodium sulfate derivatives of 2-ethylhexanol-1, sodium 2-ethyl-1-hexenyl sulfonate, sodium isooctyl sulfonate, and lower alkyl esters of aliphatic sulfocarboxylic acids such as sodium diamylsulfosuccinate.

The soaps which can be employed in the composition include among others the water-soluble salts of myristic, palmitic, stearic, behenic, oleic, lauric, abietic, capric, caproic, ricinoleic and linoleic acids, hydrogenated and dehydrogenated abietic acids, and the surface active hydrolysis products of tallow, coconut oil, cottonseed oil, soybean oil, peanut oil sesame, linseed oil, olive oil, corn oil, castor oil, and the like.

Optical brighteners can also be included in the composition. These include derivatives of diaminostilbenedisulfonic acid, derivatives of dibenzothiophene-5-5-dioxide, the oxyles, courmarin derivatives and derivatives of 6-membered-ring heterocyclics. A more thorough discussion of the optical brighteners can be found in the Kirk-Othmer, *Encyclopedia of Chemical Technology* (second edition) pp. 737-750.

Basically the composition of this invention comprises the components set forth in Table I in the quantities described therein:

TABLE I

| | Operable Percent By Weight | Preferred Percent By Weight |
|---|---|---|
| Alkali metal tetraborate | More than 85% | 95 – 98% |
| Polyvinylpyrrolidone | From 0.1 to 2% | 0.3 – 1% |
| Polyhalosalicylanilide | Up to 2% | 0.1 – 0.5% |
| Surfactant | Up to 3% | 0.2 – 0.5% |
| Optical brighteners and coloring agents | Up to 0.5% | 0.1 – 0.3% |

The composition is actually a heterogeneous mixture of the components prepared by mechanically mixing the materials in the required ratios. The alkali metal tetraborate is preferably sodium tetraborate decahydrate. The soil suspending agent, the bactericide, and the optical brighteners are all commercially available in powder form. The surfactants can be either in powder or liquid form. If they are in liquid form they are readily absorbed on powdered tetraborate.

The preferred composition is formed by mechanically mixing particulate sodium tetraborate decahydrate with the 3,4',5-tribromosalicylanilide and polyvinylpyrrolidone and, if desired, with the surfactant and the optical brighteners. The order of addition of these materials has not been found to be critical. The mixing may be carried out in a dry milling vessel or in a batch type blending vat. Small amounts of water may be added to reduce the loss of fines to the atmosphere as dust, if required.

The following examples are presented to illustrate the effectiveness of the composition of this invention and the process with which it is employed.

EXAMPLES

Standard procedure was developed for making comparative stain removal tests. A white, king size permanent press sheet, 50 percent cotton, 50 percent polyester, with 186 threads per square inch was selected for testing. The sheet was cut into swatches 4 inches wide 32 inches long. Four inch squares were marked and identified as to stain type with laundry marking ink. The squares were then stained with common household staining materials such as: chocolate, egg, peach, make-up base, mascara, french dressing, blood, mustard, catsup, grass and coffee. The staining materials were applied to the squares in a uniform manner with a medicine dropper. The solid stains were rubbed into the fabric with a plastic spatula under uniform pressure.

All of the stained swatches were then aged for 24 hours and washing was carried out under typical household conditions in a top-loading automatic washing machine, i.e., one cup of detergent and one/half cup of the borate-polyvinylpyrrolidone composition was added for a full load. (Typically, front loading washing machines require only about one/half as much detergent and additive as top-loading washing machines, but in the typical approximately 1:1 to 2:1 detergent:additive ratio.) Standard water temperature of from 125°–130°F was used and the swatch was agitated for 10 minutes at regular setting along with 7 pounds of naturally soiled laundry (approximately the same degree of soil for each load). The hardness of the water was 10 grains per gallon.

The swatches were then dried with the rest of the laundry in an automatic drier, pressed, and visually evaluated. All visual examination was conducted under standard lighting of a specially adapted "Examolite" booth.

A "stain removal index" was established based on percent removal of the stains from the swatch. For example, if no stain was visible the rating would be "100." It was found that after a short period of training the reproducibility of evaluation form individual to individual using this system was excellent.

The following experiment was carried out to evaluate the effectiveness of sodium tripolyphosphate alone and in combination with carboxymethyl cellulose and polyvinylpyrrolidone as laundry treating compositions for removing stains. The procedure followed was substantially the same as that described in the preceding examples.

A white, king-size permanent press sheet, 50 percent cotton and 50 percent polyester with 186 threads per square inch, was used in the test. The sheet was cut into swatches 4 inches wide and 32 inches long. Four-inch squares were marked and identified as to stain type with laundry marking ink. These squares were then stained with the following materials: chocolate, egg, peach, make-up base, mascara, French dressing, blood, mustard, catsup, grass, hair rinse and coffee. The staining mrterials were applied to the squares in a uniform manner with a medicine dropper. The solid stains were rubbed into the fabric with a plastic spatula under uniform pressure.

All of the stain swatches were then aged for 24 hours and washing was carried out under typical household conditions in a top-loading automatic washing machine. A water temperature of 125–130°F. was used and the swatches were agitated for 10 minutes with a load of 7 lbs. of naturally soiled laundry (approximately the same degree of soil for each load). The hardness of the water was approximately 10 grains per gallon.

The swatches were then dried with the rest of the laundry in an automatic dryer, pressed and visually evaluated under standard lighting of a specially adapted "Examolite" booth. A stain removal index based on the percent removal of the stains was used in evaluating the swatches. For example, if no stain was visible, the rating is 100, if 50 percent of the stain has been removed, the rating is 50.

Using the above-described procedure, the swatches were pre-treated with compositions of the test and then washed in a commercial detergent (Advanced ALL) plus ½ cup of the pretreatment test material. The pretreatment consisted of applying the mixture directly to the stain area after the stain had been dampened with water. The mixture was sprinkled on the stained area and rubbed in lightly to permit the composition to penetrate into the fabric at a high concentration to reduce the tenacity of the staining components. The amount of water used was sufficient only to work the mixture into the stain area.

Each set of stained swatches was pre-treated with (A) the detergent alone, (B) sodium tripolyphosphate, (C) sodium tripolyphosphate plus 0.5 percent carboxymethyl cellulose or (D) sodium tripolyphosphate plus 0.5 percent polyvinylpyrrolidone. They were then washed with the detergent plus ½ cup of the pretreatment mixture. The following table gives the average percent removal of stains observed. The percent rating was the percent of 1,200 possible points accumulated for the 12 staining materials on the cloth swatches.

Table II

| Treatment | Percent Stain Removal |
| --- | --- |
| A. Pre-treat with detergent then wash with same | 74 |
| B. Pre-treat with sodium tripolyphosphate then wash with detergent plus ½ cup same | 72 |
| C. Pre-treat with sodium tripolyphosphate plus 0.5% carboxymethyl cellulose then wash with detergent plus ½ cup same | 72 |
| D. Pre-treat with sodium tripolyphosphate plus 0.5% polyvinylpyrrolidone then wash with detergent plus ½ cup of same | 80 |

Using the foregoing procedure the swatches were pretreated and washed in commercial detergents, enzyme containing detergents, inert builders with polyvinylpyrrolidone, active stain removing materials such as sodium tetraborate and sodium tetraborate with polyvinylpyrrolidone. The pretreatment consisted of applying the mixture directly to the stained area after the stained area had been dampened with water. The mixture was sprinkled on the dampened fabric area and rubbed in lightly to permit the composition to penetrate into the fabric in a high concentration to reduce the tenacity of the staining components. The amount of water used was sufficient only to work the mixture into the stained area. The borate-polyvinylpyrrolidone mixture used for pretreatment was part of the total additive in wash and conditions were maintained as close as possible for each treatment and the pretreating compositions were all mixed in the same manner.

Table III summarizes the average percent removal of stains observed by several individuals. The percent rating is the percent of 1,200 possible points accumulated for the 12 staining materials on the cloth swatches.

TABLE III

| Treatment | % Stain Removal When Detergent Is: | |
| --- | --- | --- |
| | Detergent No. 1 (a) | Detergent No. 2 (b) |
| Treat with detergent then wash with same | 82 | 67 |
| Treat with sodim tetraborate decahydrate then wash with detergent | 76 | 55 |
| Treat with socium tetraborate decahydrate and 0.5% carboxymethyl cellulose then wash with detergent + same (c) | 77 | 73 |
| Treat with sodium tetraborate decahydrate + 0.5% polyvinylpyrrolidone (d) then wash with detergent and same (c) | 94 | 84 |
| Treat with sodium sulfate + polyvinylpyrrolidone (d) then wash with detergent + same (c) | 77 | 40 |

TABLE III—Continued

| Treatment | % Stain Removal When Detergent Is: | |
|---|---|---|
| | Detergent No. 1 (a) | Detergent No. 2 (b) |
| No treatment — washed with detergent only | 62 | 59 |
| Treat with sodium tetraborate decahydrate and 0.5% polyvinylalcohol then wash with detergent + same (c) | 82 | — |

(a) "TIDE XK" with enzymes
(b) "Advanced ALL", without enzymes
(c) Additive: detergent ratio approximately one-to-one
(d) Average molecular weight 15,000 to 40,000

The detergents were commercially available and selected at random for evaluation of the pretreating compositions. Detergent No. 1 was an enzyme containing detergent. Each of the mixtures included the same minor amounts of surfactants and optical brighteners. The weight ratio of sodium tetraborate to polyvinylpyrrolidone, ignoring the water of hydration, was about 100:1.

As can be seen from Table III, the mixture of sodium tetraborate and polyvinylpyrrolidone (average molecular weight from 15,000–40,000) exhibited more than a 10 percent increase in stain removal over the next most effective treatment. The treatment and wash with detergent No. 1 alone was better at stain removal than treatment with any of the treating agents other than that of this invention. One significant aspect of Table III is that neither sodium tetraborate alone nor polyvinylpyrrolidone with an inert builder (sodium sulfate) were able to enhance the stain removing characteristics of the detergents alone whereas the combination of sodium tetraborate with the polyvinylpyrrolidone exhibited a synergistic increase in the stain removing efficiency which could be attributed to neither alone nor could be expected from the combination. Polyvinylpyrrolidone with the relatively inert builder sodium sulfate was found to be not only less effective but actually reduced the enzyme detergent's capacity to remove stains.

In order to compare the effectiveness of borax (sodium tetraborate decahydrate), sodium tripolyphosphate, and sodium sulfate alone and in combination with polyvinylpyrrolidone as laundry treating compositions for removing stains, the above procedure was essentially repeated using these builders.

A white, king-size permanent press sheet, 50 percent cotton and 50 polyester with 186 threads per square inch, was used in the test. The sheet was cut into swatches 3½ inches wide and 42 inches long. Three and ½ inch squares were marked and identified as to stain type with laundry marking ink. These squares were then stained with the following materials: chocolate, egg, peach, make-up base, mascara, French dressing, blood, mustard, ketsup, grass, hair rinse, and coffee. The liquid staining materials were applied to the squares in a uniform manner with a medicine dropper. The solid stains were rubbed into the fabric with a plastic spatula under uniform pressure.

All of the stained swatches were then aged for 24 hours and washing was carried out under typical household conditions in a top-loading automatic washing machine. A water temperature of 125°–130°F. was used and the swatches were agitated for 10 minutes with a load of 7 lbs. of naturally soiled laundry (approximately the same degree of soil for each load). The hardness of the water was approximately 10 grains per gallon.

The swatches were then pressed dry and visually evaluated under standard lighting of a specially adapted "Examolite" booth. A stain removal index based on the percent removal of the stains was used in evaluating the swatches. For example, if no stain was visible, the rating is 100, if 50 percent of the stain has been removed, the rating is 50.

Using the above-described procedure, the swatches were pretreated with the compositions of the test and then washed in a commercail detergent (TIDE) plus one cup of the pretreatment test material. The pretreatment procedure consisted of applying the mixture directly to the stained area after the stain had been wetted with water. The mixture was sprinkled on the stained area, scrubbed with a brush, allowed to stand 10 minutes and then rescrubbed.

Each set of stained swatches was pretreated with (A) borax, (B) borax plus 0.5 percent polyvinylpyrrolidone, (C) sodium tripolyphosphate, (D) sodium tripolyphosphate plus 0.5 percent polyvinylpyrrolidone, (E) sodium sulfate, (F) sodium sulfate plus 0.5 percent polyvinylpyrrolidone. One set of swatches was then washed with the detergent (one cup in a top-loading washing machine) and one set was washed with the detergent plus one cup of the pretreatment mixture. The tests were run in duplicate and an average of the duplicates was used for the final rating. The stains were observed and each stained swatch rated for percent removal. The percent removal of each of the 12 stains was totaled to give an average of stain removal based on a possible 1,200 points. Table IV gives the average of the duplicate totals for stain removal.

Table IV

| Pretreatment | Wash | Stain Removal |
|---|---|---|
| Borax | Tide | 905 |
| (Borax + PVP) | Tide | 900 |
| Borax | Tide + borax | 915 |
| (Borax + PVP) | Tide + (borax + PVP) | 970 |
| Phosphate | Tide | 950 |
| (Phosphate + PVP) | Tide | 905 |
| Phosphate | Tide + phosphate | 875 |
| (Phosphate + PVP) | Tide + (phosphate + PVP) | 905 |
| Sulfate | Tide | 835 |
| (Sulfate + PVP) | Tide | 815 |
| Sulfate | Tide + sulfate | 735 |
| (Sulfate + PVP) | Tide + (sulfate + PVP) | 725 |

It is particularly interesting that the combination of borax plus polyvinylpyrrolidone (PVP) when used as a pretreatment and in the wash cycle according to conventional washing procedures results in better stain removal than even the tripolyphosphate or phosphate-PVP pretreatment and wash. Sodium tripolyphosphate is known to be a highly superior builder for detergents whereas borax is known to be only moderately effective as a detergent builder per se. Likewise, phosphates are an effective cleaner for paint and other difficult to remove materials and stains. The difference between the effectiveness of the borax-PVP composition and the phosphate-PVP composition is highly unexpected and surprising since the stain removal power of a highly effective phosphate detergent, Tide, is actually reduced by the combined use of tripolyphosphate-PVP pretreatment and additive whereas the combined use of borax-PVP with Tide gives stain removal effectiveness heretofore unknown and unattainable using previous builder-suspending agent-detergent combinations.

It is also significant that the combined use of Tide and sulfate-PVP resulted in lower stain removal, although the actual stain removal effectiveness is lower than with the phosphates, which would be expected in view of the known superiority of phosphate as a builder over sulfate.

No explanation for the unexpected synergism of borax and polyvinylpyrrolidone, which is contrary to the trend established using other builders, is presently available.

The preferred amount of borax-PVP additive for use in combination with soaps and synthetic detergents is in the ratio of about 1-to-1, i.e., about 1 cup of each in a top loading washer (subject to the usual variations due to water quality, individual preference of housewives, etc.) and the preferred amount of composition for use in a soaking pretreatment has been found to be about ½ cup per gallon of water used in the soak. Even small amounts of the composition in the pretreatment soak show some beneficial effect, however, and greater amounts than ½ cup per gallon are not harmful. A saturated solution should be avoided, of course. Similarly the longer the soak the more effective it has been found to be. About 2 hours are preferred, but even a 5 minute soaking pretreatment has been found to produce some beneficial effect. To obtain adequate sanitizing effectiveness the fabric should be soaked at least 6 hours.

A series of test sample compositions were prepared as listed in Table V to determine the sanitizing effectiveness of the bactericidal agent contemplated for use with the composition of this invention. The procedure was to place 50 grams of the sample into a sterile gallon jar containing 1,897 ml. of distilled water. Cleanly washed gauze diapers were then cut in half. Each piece weighted approximately 30 grams.

Two, 2- × 2-inch sterile cotton print cloth swatches were inoculated with 0.25 ml of a 24 hour-broth culture of *Staphylococcus aureus* ATCC No. 6,538 or *Escherichia coli* ATCC No. 4,352 and aseptically attached to each 30-gram piece of diaper. Two diaper pieces, each containing two inoculated swatches, were placed into each of the gallon jars containing the sample solutions. The soaking times were 6 and 24 hours at room temperature. After each required soaking time, one diaper piece was taken out of the sample solution and excess liquid removed by squeezing. Both swatches were aseptically removed from the diaper piece and placed into a sterile Waring blender jar, containing 100 ml of sterile 0.1 percent Peptone water. The swatches were macerated to resuspend the organism. Four successive 10-fold dilutions were prepared from the inoculated swatches. Duplicate 1.0 ml portions were plated in Tryptic digest Letheen agar. These represented 0.01, 0.001, 0.0001 and 0.00001 portions of the total bacteria present on the swatch. All agar plates were incubated for 24 or 48 hours at 37°C. Colonies developing were counted using a Quebec viewer. The percent reduction in bacteria count is given in Table V.

It was further observed that the presence of tribromosalicylanilide in the composition caused continued inhibition of the growth of *Staph aureus* even after drying. The reduction of bacteria count as shown in Table V was not due to the 3,4',5-tribromosalicylanilide alone since poorest reduction was obtained when the halosalicylanilide was combined with the inert sodium sulfate builder.

What is claimed is:

1. A laundry treating composition having effective stain removal properties for household stains consisting essentially of a mixture of 85 to 99 percent sodium tetraborate decahydrate and from about 0.1 to 2 percent polyvinylpyrrolidone having an average molecular weight of from about 15,000 to 40,000.

2. A laundry treating composition as defined in claim 1 further including up to about 2 percent by weight of at least one bactericide selected from the group consisting of tribromosalicylanilides, triiodosalicylanilides, Table V

|  | Reduction of Bacteria After Exposure at Various Times in Percent | | | | | |
|---|---|---|---|---|---|---|
|  | Staph. aureus | | | E. coli | | |
|  | 1 hr. | 6 hrs. | 24 hrs. | 1 hr. | 6 hrs. | 24 hrs. |
| Sodium tetraborate + polyvinylpyrrolidone + 3,4',5-tribromosalicylanilide | 92.6 | 99.6 | 99.995 | 96.1 | 98.6 | 99.6 |
| Sodium tetraborate + polyvinylpyrrolidone |  | 99.3 | 99.999 |  | 91.4 | 99.7 |
| Sodium sulfate + polyvinylpyrrolidone + 3,4',5-tribromosalicylanilide |  | 86.4 | 99.9999 |  | 59.0 | 65.7 |

Concentration: 50 gm. in 1892 ml. (half gallon) of distilled water.

trichlorosalicylanilides, dibromo-chlorosalicylanilides, dibromosalicylanilides, and dibromo-trifluoromethyl-salicylanilides.

3. A laundry treating composition as defined in claim 2 wherein said bactericidal agent is 3,4',5-tribromosalicylanilide.

4. A laundry treating composition as defined in claim 1 further including up to about 3 percent by weight of a nonionic or anionic surfactant and up to 0.5 percent by weight optical brighteners.

5. A borate composition for treating stained water washable fabrics to enhance the stain removal effectiveness of a detergent wash consisting essentially, in percent by weight, of a mixture of:

| | |
|---|---|
| sodium tetraborate decahydrate | 85 – 99% |
| polyvinylpyrrolidone — about 15,000 to 40,000 molecular weight range | 0.1 – 2% |
| tribromosalicylanilide | up to 2% |
| anionic surfactant | up to 3% |

6. A borate composition as defined in claim 5 consisting essentially, in approximate percent by weight, of:

| | |
|---|---|
| sodium tetraborate decahydrate | 95 – 98% |
| polyvinylpyrrolidone — about 15,000 to 40,000 molecular weight | 0.3 – 1% |
| tribromosalicylanilide | 0.1 – 0.5% |
| anionic surfactant | less than 0.5% |

* * * * *